United States Patent
Shin et al.

(10) Patent No.: US 10,274,792 B2
(45) Date of Patent: Apr. 30, 2019

(54) LIQUID-CRYSTAL DISPLAY DEVICE

(71) Applicant: Samsung Display Co. Ltd., Yongin-si (KR)

(72) Inventors: Cheol Shin, Hwaseong-si (KR); Hak Sun Chang, Yongin-si (KR); Jin Ah Kim, Seoul (KR); Se Hyun Lee, Seoul (KR); Seung Min Lee, Asan-si (KR); Jung Wook Lee, Anyang-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 23 days.

(21) Appl. No.: 15/588,191

(22) Filed: May 5, 2017

(65) Prior Publication Data

US 2017/0363917 A1 Dec. 21, 2017

(30) Foreign Application Priority Data

Jun. 17, 2016 (KR) .................. 10-2016-0075596

(51) Int. Cl.
*G02F 1/1333* (2006.01)
*G02F 1/1337* (2006.01)
*G02F 1/1343* (2006.01)
*G02F 1/1362* (2006.01)
*G02F 1/1368* (2006.01)

(52) U.S. Cl.
CPC ...... *G02F 1/134309* (2013.01); *G02F 1/1368* (2013.01); *G02F 1/133345* (2013.01); *G02F 1/136227* (2013.01); *G02F 1/136286* (2013.01); *G02F 1/133707* (2013.01); *G02F 2001/136218* (2013.01); *G02F 2201/121* (2013.01); *G02F 2201/123* (2013.01)

(58) Field of Classification Search
CPC ............... G02F 2001/136218; G02F 1/133707
See application file for complete search history.

(56) References Cited

U.S. PATENT DOCUMENTS

2012/0105785 A1* 5/2012 Kim ..................... G09G 3/3648
349/139

FOREIGN PATENT DOCUMENTS

KR 1020170062562 6/2017

* cited by examiner

*Primary Examiner* — Jessica M Merlin
(74) *Attorney, Agent, or Firm* — Cantor Colburn LLP

(57) ABSTRACT

A liquid-crystal display device includes a substrate, a thin-film transistor ("TFT") disposed on the substrate, an insulation film disposed on the TFT, a pixel electrode disposed on the insulation film, an expanded electrode disposed in a same layer as the pixel electrode, a connection electrode which is disposed in the same layer as the pixel electrode and connects the pixel electrode with the expanded electrode, and a shield electrode disposed in the same layer as the pixel electrode and separated from the pixel electrode, the connection electrode and the expanded electrode, where the expanded electrode is electrically connected to the TFT via a contact hole defined in the insulation film, and where the shield electrode includes a first shield portion disposed between the pixel electrode and the contact hole in a plan view, and a second shield portion other than the first shield portion.

20 Claims, 9 Drawing Sheets

LIQUID-CRYSTAL DISPLAY DEVICE

This application claims priority to Korean Patent Application No. 10-2016-0075596, filed on Jun. 17, 2016, and all the benefits accruing therefrom under 35 U.S.C. § 119, the content of which in its entirety is herein incorporated by reference.

BACKGROUND

1. Field

Exemplary embodiments of the invention relate to a liquid-crystal display ("LCD") device.

2. Description of the Related Art

A liquid-crystal display ("LCD") device is one of the commonly used display devices. The LCD device generally includes two substrates on which field generating electrodes such as a pixel electrode and a common electrode are formed, and a liquid-crystal layer disposed between the two substrates. The LCD device displays an image in such a manner that voltages are respectively applied to the field generating electrodes to generate an electric field across the liquid-crystal layer, and liquid-crystal molecules included in the liquid-crystal layer are aligned by the electric field so as to control a polarization of incident light.

Among various types of the LCD device, a vertically aligned ("VA") mode LCD in which major axes of liquid-crystal molecules are oriented perpendicular to upper and lower substrates when an electric field is not applied is under development.

SUMMARY

A liquid-crystal display ("LCD") device includes a plurality of pixels, each of which is the minimum unit for controlling the light transmittance individually. A pixel electrode is disposed in each of the pixels. However, the electric field may be unstable at an area where the pixel electrode is connected to elements for controlling a pixel. As a result, control over the liquid-crystal molecules by the pixel electrode may be weakened.

Accordingly, a structure which suppresses the electric field in a pixel from becoming unstable while enhancing control over the liquid-crystal molecules is desired.

According to an exemplary embodiment of the invention, there is provided a liquid-crystal display device. The liquid-crystal display device includes a substrate, a thin-film transistor ("TFT") disposed on the substrate, an insulation film disposed on the TFT, a pixel electrode disposed on the insulation film, an expanded electrode disposed in a same layer as the pixel electrode, a connection electrode which is disposed in the same layer as the pixel electrode and which connects the pixel electrode with the expanded electrode, and a shield electrode disposed in the same layer as the pixel electrode and separated from the pixel electrode, the connection electrode and the expanded electrode, where the expanded electrode is electrically connected to the TFT via a contact hole defined in the insulation film, and where the shield electrode includes a first shield portion disposed between the pixel electrode and the contact hole in a plan view, and a second shield portion other than the first shield portion.

According to another exemplary embodiment of the invention, there is provided a liquid-crystal display device. The liquid-crystal display device includes a substrate, a TFT disposed on the substrate, a pixel electrode disposed on the TFT, an expanded electrode disposed in a same layer as the pixel electrode and connected to the TFT, a connection electrode which is disposed in the same layer as the pixel electrode and which connects the pixel electrode with the expanded electrode, and a shield electrode disposed in the same layer as the pixel electrode and separated from the pixel electrode, the connection electrode and the expanded electrode, where the shield electrode includes a first shield portion disposed between the pixel electrode and the expanded electrode, and a second shield portion other than the first shield portion.

Exemplary embodiments of the invention provide an LCD device which suppresses the electric field from becoming unstable.

Exemplary embodiments of the invention also provide an LCD device with enhanced control over liquid-crystal molecules by a pixel electrode.

These and other exemplary embodiments and advantages of the invention will become immediately apparent to those of ordinary skill in the art upon review of the Detailed Description and Claims to follow.

According to exemplary embodiments of the invention, there is provided an LCD device which suppresses electric field from becoming unstable.

In addition, according to exemplary embodiments of the invention, there is provided an LCD device with enhanced control over liquid-crystal molecules.

It should be noted that effects of the invention are not limited to those described above and other effects of the invention will be apparent to those skilled in the art from the following descriptions.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
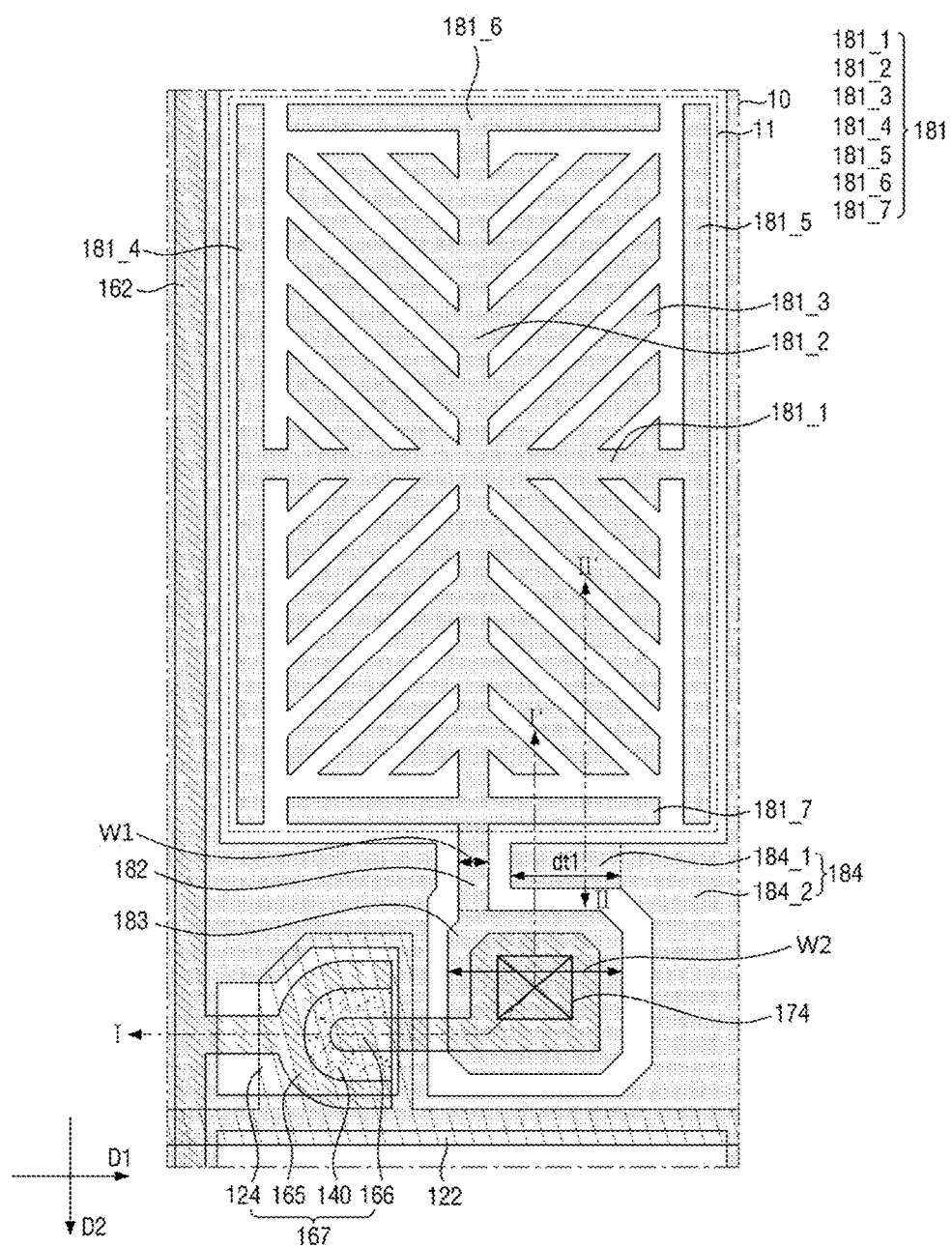
FIG. 1 is a plan view of a single pixel in an exemplary embodiment of a liquid-crystal display ("LCD") device according to the invention.

The invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

In the invention, an electronic apparatus may be any apparatus provided with a display device. Examples of the electronic apparatus may include smart phones, mobile phones, navigators, game machines, TVs, car head units, notebook computers, laptop computers, tablet computers, personal media players ("PMPs"), and personal digital assistants ("PDAs"). The electronic apparatus may be embodied as a pocket-sized portable communication terminal having a wireless communication function. Further, the display device may be a flexible display device of which a shape is changeable.

Hereinafter, exemplary embodiment of the invention will be described with reference to the accompanying drawings.

Figure 2:
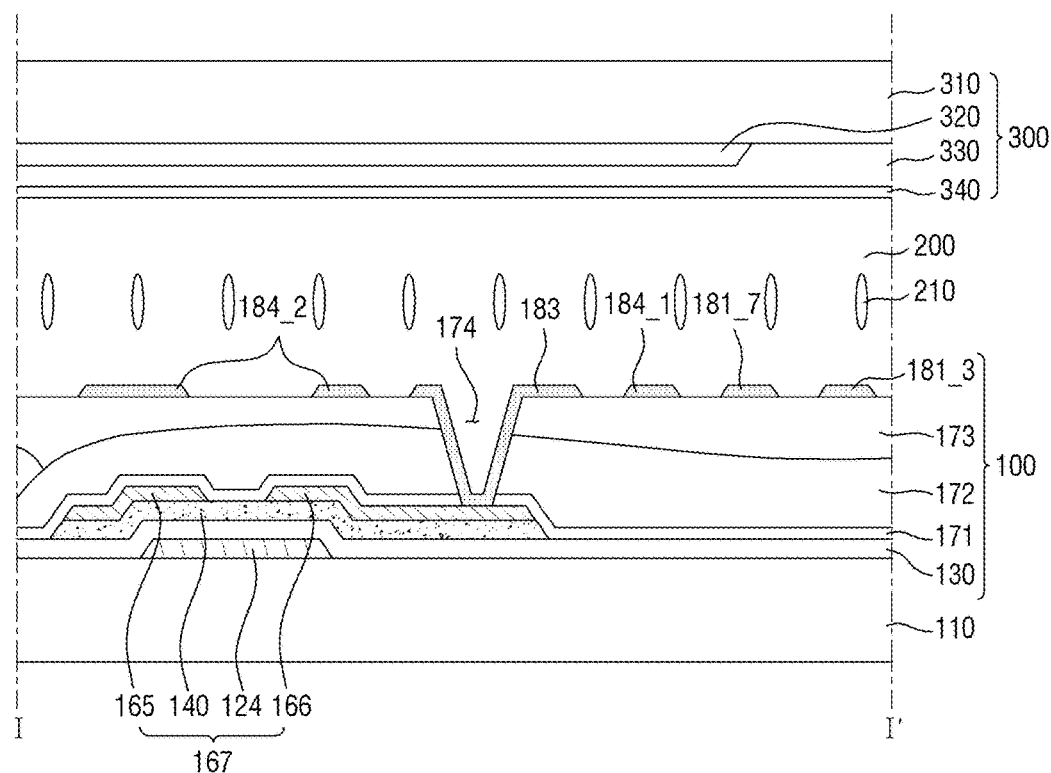
FIG. 2 is a cross-sectional view taken along line I-I' of FIG. 1.

FIG. 1 is a plan view of a single pixel in an LCD device according to an exemplary embodiment of the invention. FIG. 2 is a cross-sectional view taken along line I-I' of FIG. 1.

Referring to FIGS. 1 to 2, the LCD device according to the exemplary embodiment of the invention includes a first display substrate 100, a second display substrate 300 and a liquid-crystal layer 200. The LCD device may further include a pair of polarizers (not shown) disposed on outer surfaces of the first display substrate 100 and the second display substrate 300.

In the first display substrate 100, a switching element, e.g., a thin-film transistor ("TFT") 167, for driving liquid-crystal molecules 210 in the liquid-crystal layer 200 is disposed. The second display substrate 300 faces the first display substrate 100.

The liquid-crystal layer 200 is interposed between the first display substrate 100 and the second display substrate 300 and may include liquid-crystal molecules 210 having dielectric anisotropy. When an electric field is applied across the first display substrate 100 and the second display substrate 300, the liquid-crystal molecules 210 are tilted in a predetermined direction between the first display substrate 100 and the second display substrate 300 to thereby transmit or block light. Herein, the term rotation may refer not only to actual rotation of the liquid-crystal molecules 210 but also to a change in orientation of the liquid-crystal molecules 210 by the electric field.

The LCD device includes a plurality of pixels 10 arranged in a matrix. The gray scale of the pixels 10 may be individually controlled. Each of the pixels 10 may work as a unit for producing a predetermined color. Each of the pixels 10 includes an active area 11 in which incident light from the bottom of the first display substrate 100 is transmitted toward the top of the second display substrate 300 such that colors are actually displayed.

Hereinafter, the first display substrate 100 will be described.

The first display substrate 100 includes a first base substrate 110. The first base substrate 110 may be a transparent insulation substrate. In an exemplary embodiment, the first base substrate 110 may be a glass substrate, a quartz substrate, a transparent resin substrate, etc., for example.

In exemplary embodiments, the first base substrate 110 may be curved in a direction. In some other embodiments, the first base substrate 110 may have flexibility. That is, the first base substrate 110 may be deformable so that it may be rolled, folded, bent and so on.

A gate line 122 and a gate electrode 124 are disposed on the first base substrate 110.

The gate line 122 delivers a gate signal for controlling the TFT 167. The gate line 122 may be extended in a first direction D1.

As used herein, the first direction D1 refers to a direction extending in parallel with a side of the first base substrate 110 in the plane where the first base substrate 110 is disposed. As shown in FIG. 1, the first direction D1 may be defined as a direction indicated by a straight line extending from the left side to the right side. However, the first direction D1 is not limited to being in parallel with a side of the first base substrate 110. The first direction D1 may be a direction indicated by any straight line extending in a direction on the first base substrate 110.

The gate signal may have a varying voltage value provided from an external source, and the TFT 167 may be turned on/off in response to the voltage value of the gate signal.

The gate electrode 124 may protrude from the gate line 122 and may be physically connected to the gate line 122. The gate line 124 may be one of the elements of the TFT 167 which will be described later.

The gate line 122 and the gate electrode 124 may include the same material. In an exemplary embodiment, the gate line 122 and the gate electrode may include an aluminum-based metal such as aluminum (Al) and an aluminum alloy, a silver-based metal such as silver (Ag) and a silver alloy, a gold-based metal such as copper (Cu) and a copper alloy, a molybdenum-based metal such as molybdenum (Mo) and a molybdenum alloy, chrome (Cr), tantalum (Ta), and titanium (Ti), for example. The gate line 122 and the gate electrode 124 may have a single layer structure. In an alternative exemplary embodiment, the gate line 122 and the gate electrode 124 may have a multi-layer structure including at least two conductive films having different physical properties.

A first insulation film 130 is disposed on the gate line 122 and the gate electrode 124. In an exemplary embodiment, the first insulation film 130 may include an insulative material, for example, silicon nitride or silicon oxide. The first insulation film 130 may have a single layer structure or may have multi-layer structure including two insulation layers having different physical properties.

A semiconductor layer 140 is disposed on the first insulation layer 130. The semiconductor layer 140 may overlap at least a part of the gate electrode 124. In an exemplary embodiment, the semiconductor layer 140 may include amorphous silicon, polycrystalline silicon or oxide semiconductor, for example.

The semiconductor layer 140 may overlap a data line 162, a source electrode 165 and a drain electrode 166 to be described later, as well as the gate electrode 124.

Although not shown in the drawings, in exemplary embodiments, an ohmic contact element may be additionally disposed on the semiconductor layer 140. In an exemplary embodiment, the ohmic contact element may include n+ hydrogenated amorphous silicon that is highly doped with n-type impurities, or may include silicide, for example. A pair of the ohmic contact elements may be disposed on the semiconductor layer 140. The ohmic contact elements may be disposed between the source electrode 165 and the semiconductor layer 140 and between the drain electrode 166 and semiconductor layer 140, so that the aforementioned elements have ohmic contact property. When the semiconductor layer 140 includes oxide semiconductor, the ohmic contact member may be eliminated.

On the semiconductor layer 140 and the first insulation film 130, the data line 162, the source electrode 165 and the drain electrode 166 are disposed.

The data line 162 may be extended in a second direction D2 to intersect the gate line 122.

Herein, the second direction D2 may be a direction intersecting the first direction D1 in the plane where the first base substrate 110 is disposed. As shown in FIG. 1, the second direction D2 may be a direction indicated by a straight line extending from the upper side to the lower side in the plan view. In an exemplary embodiment, the first direction D1 may be perpendicular to the second direction D2.

The data line 162 may be insulated from the gate line 122 and the gate electrode 124 by the first insulation film 130.

The data line 162 may provide a data signal to the source electrode 165. The data signal may have a varying voltage value provided from an external source, and the gray scale of each of the pixels 10 may be controlled in response to the data signal. The source electrode 165 may branch from the data line 162 and may overlap at least a part of the gate electrode 124.

In FIG. 1, the drain electrode 166 may be spaced apart from the source electrode 165 with the semiconductor layer 140 therebetween and may overlap the gate electrode 124 at least partially.

As shown in FIG. 1, the source electrode 165 may have a C-shape such that the source electrode 165 surrounds the drain electrode 166 with a gap therefrom. However, this is merely illustrative. In an alternative exemplary embodiment, the source electrode 165 may have a rod-like shape such that the source electrode 165 may be disposed in parallel with the drain electrode 166 with a gap therefrom.

The data line 162, the source electrode 165 and the drain electrode 166 may include the same material. In an exemplary embodiment, the data line 162, the source electrode 165 and the drain electrode 166 may include aluminum, copper, silver, molybdenum, chrome, titanium, tantalum or an alloy thereof, for example. In an exemplary embodiment, the data line 162, the source electrode 165 and the drain electrode 166 may have, but is not limited to, a multi-layer structure comprised of a lower layer (not shown) such as a refractory metal and a low-resistance upper layer (not shown) disposed on the lower layer.

The gate electrode 124, the semiconductor layer 140, the source electrode 165 and the drain electrode 166 form the switching element, i.e., the TFT 167.

A passivation layer 171 is disposed on the first insulation layer 130 and the TFT 167. The passivation layer 171 may include an inorganic insulative material and may cover the TFT 167. The passivation layer 171 may protect the TFT 167 and may prevent materials included in a color filter layer 175 and a planarization layer to be described below from being introduced into the semiconductor layer 140.

The color filter layer 172 is disposed on the passivation layer 172. The color filter layer 172 may be a photosensitive organic composition including a pigment for reproducing a color and may include one of red, green or blue pigments. In an exemplary embodiment, the color filter layer 172 may include a plurality of color filters, for example. In an exemplary embodiment, each of the plurality of color filters may represent one of primary colors including red color, green color and blue color, for example. However, this is merely illustrative. In other exemplary embodiments, each of the plurality of color filters may one of cyan, magenta, yellow and white colors.

A second insulation film 173 is disposed on the color filter layer 172. The second insulation film 173 may include an insulative material and may be an organic film including an organic material, for example. The second insulation film 173 may provide a flat surface over the elements having different levels disposed between the second insulation film 173 and the first base substrate 110. In other words, the upper surface of the second insulation film 172 may be substantially flat.

In the passivation layer 171, the color filter layer 172 and the second insulation film 173, a contact hole 174 may be defined in the direction perpendicular to the first base substrate 110 to expose a part of the TFT 167, more specifically, a part of the drain electrode 166. The contact hole 174 may penetrate the passivation layer 171, the color filter layer 172 and the second insulation film 173 in the direction perpendicular to the first base substrate 110. The part of the drain electrode 166 may be physically and electrically connected to the elements disposed on the second insulation film 173, e.g., an expanded electrode 183 to be described below, via the contact hole 174.

On the second insulation film 173, the pixel electrode 181, a connection electrode 182, the expanded electrode 183 and a shield electrode 184 are disposed.

The pixel electrode 181 may be physically and electrically connected to the expanded electrode 183 via the connection electrode 182. The pixel electrode 181 may receive the data signal from the drain electrode 166.

In an exemplary embodiment, the pixel electrode 181 may include a transparent conductive material such as indium tin oxide ("ITO"), indium zinc oxide ("IZO"), indium tin zinc oxide ("ITZO"), Al-doped zinc oxide ("AZO").

An opening where no transparent conductive material is disposed may be defined in the pixel electrode 181. By the opening, a pattern is defined in the pixel electrode 181. The direction and degrees that the liquid-crystal molecules 210 above the pixel electrode 181 are tilted may be controlled depending on the shape and the pattern of the pixel electrode 181

The pixel electrode 181 includes a first stem electrode 181_1, a second stem electrode 181_2, a plurality of branch electrodes 181_3, a first side electrode 181_4, a second side electrode 181_5, a third side electrode 181_6, and a fourth side electrode 181_7.

The portions of the pixel electrode 181 may be disposed in the active area 11. However, this is merely illustrative. In exemplary embodiments of the invention, portions of the pixel electrode 181 may be disposed outside the active area 11.

The first stem electrode 181_1 is extended in the first direction D1, and the second stem electrode 181_2 is extended in the second direction D2. The first stem electrode 181_1 and the second stem electrode 181_2 may intersect each other to form a cross and may be physically connected to each other at the intersection.

Each of the branch electrodes 181_3 may be extended from the first stem electrode 181_1 and the second stem electrode 181_2 in a direction oblique to the first direction D1 or the second direction D2, i.e., in a sloped direction that is not parallel with the first direction D1 and the second direction D2. The branch electrodes 181_3 may be in parallel with one another in each of the areas defined by the first stem electrode 181_1 and the second stem electrode 181_2 and may be extended from the intersection between the first stem electrode 181_1 and the second stem electrode 181_2.

The first side electrodes 181_4 is extended in the second direction D2 and is connected to one end of the first stem electrode 181_1. The second side electrodes 181_5 is extended in the second direction D2 and is connected to the other end of the second stem electrode 181_2. The other end refers to the opposite end of the one end. That is, in FIG. 1, the first side electrodes 181_4 is connected to the left end of the first stem electrode 181_1, and the second side electrode 181_5 is connected to the right end of the first stem electrode 181_1.

The third side electrodes 181_6 is extended in the first direction D1 and is connected to one end of the second stem electrode 181_2. The fourth side electrodes 181_7 is extended in the first direction D1 and is connected to the other end of the second stem electrode 181_2. That is, in FIG. 1, the third side electrodes 181_6 is connected to the upper end of the second stem electrode 181_2, and the fourth side electrode 181_7 is connected to the lower end of the second stem electrode 181_2.

The expanded electrode 183 is disposed in the same layer as the pixel electrode 181, and is spaced apart from the pixel electrode 181. It is to be noted that the expanded electrode 183 is electrically and physically connected to the pixel electrode 181 by the connection electrode 182, and that the signal provided to the expanded electrode 183 may be provided to the pixel electrode 181. Herein, the phrase that the expanded electrode 183 is provided in the same layer as the pixel electrode 181 means that the expanded electrode 183 and the pixel electrode 181 are provided simultaneously during the fabricating process, but does not necessarily mean that the expanded electrode 183 and the pixel electrode 181 are equally spaced apart from the first base substrate 110. Accordingly, the distance between the expanded electrode 183 and the first base substrate 110 may be substantially equal to the distance between the pixel electrode 181 and the first base substrate 110, although the distances may be different from each other in some areas. In an exemplary embodiment, in the area where the contact hole 174 is defined, the distance between the expanded electrode 183 and the first base substrate 110 may be quite different from the distance between the pixel electrode 181 and the first base substrate 110.

The expanded electrode 183 and the pixel electrode 181 may include the same material.

The expanded electrode 183 overlaps the contact hole 174 and the drain electrode 166 in plan view. The expanded electrode 183 may be physically and electrically connected to the drain electrode 166 via the contact hole 174. Herein, the phrase "the expanded electrode is physically connected to the drain electrode" means that the expanded electrode 183 and the drain electrode 166 contact each other at least partially.

The connection electrode 182 connects the expanded electrode 183 with the pixel electrode 181. Specifically, the connection electrode 182 is extended from the fourth side electrode 181_7 and comes in contact with the expanded electrode 183.

In an exemplary embodiment, a width W1 perpendicular to the direction in which the connection electrode 182 is extended may be smaller than the minimum value of a width W2 of the expanded electrode 183. That is, there may be an area where the connection electrode 182 is not disposed between the pixel electrode 181 and the expanded electrode 183. The shield electrode 184 to be described below may be disposed between the pixel electrode 181 and the expanded electrode 183 due to such structure of the connection electrode 182.

The connection electrode 182 and the pixel electrode 181 may include the same material.

As the connection electrode 182 connects the expanded electrode 183 with the pixel electrode 181, the data signal provided from the drain electrode 166 to the expanded electrode 183 may be delivered to the pixel electrode 181 via the connection electrode 182.

The shield electrode 184 and the pixel electrode 181 may be disposed in the same layer. The shield electrode 184 is spaced apart from the pixel electrode 181, the connection electrode 182 and the expanded electrode 183 so that the shield electrode 184 does not contact or overlap the pixel electrode 181, the connection electrode 182 and the expanded electrode 183. The shield electrode 184 is neither physically nor electrically connected to the pixel electrode 181, the connection electrode 182 and the expanded electrode 183. Accordingly, the data signal which is provided to the pixel electrode 181, the connection electrode 182 and the expanded electrode 183 is not provided to the shield electrode 184

In an exemplary embodiment, the shield electrode 184 may include a transparent conductive material such as ITO, IZO, ITZO and AZO and may include the same material as that of the pixel electrode 181.

The shield electrode 184 includes a first shield portion 184_1 that is disposed between the pixel electrode 181 and the expanded electrode 183, and a second shield portion 184_2 that is a remaining part of the shield electrode 184.

The first shield portion 184_1 may prevent the pixel electrode 181 and the expanded electrode 183 from interfering with each other. Specifically, the first shield portion 184_1 may clearly separate the electric field generated by the pixel electrode 181 from the electric field generated by the expanded electrode 183. Accordingly, it is possible to suppress the electric field between the pixel electrode 181 and the expanded electrode 183 from becoming unstable, and it is possible to enhance the control over the liquid-crystal molecules 210 by the pixel electrode 181. A detailed description thereof will be made below.

The second shield portion 184_2 is the other portion than the first shield portion 184_1 and overlaps the area other than the active area 11 except for the connection electrode 182, the expanded electrode 183 and the second shield portion 184_2. It will be understood that the second shield portion 184_2 may not necessarily overlap all of the area other than the active area 11 except for the connection electrode 182, the expanded electrode 183 and the second shield portion 184_2 but may exclude some of them.

In an exemplary embodiment, the second shield portion 184_2 may overlap the data line 162. As the data signal is provided to the data line 162, the liquid-crystal molecules 210 disposed above the data line 162 are likely to be affected. For this reason, the second shield portion 184_2 is disposed to prevent the above-described feature.

The first shield portion 184_1 may protrude from the second shield portion 184_2. In an exemplary embodiment, in FIG. 1, the first shield portion 184_1 may protrude to the left from the second shield portion 184_2 disposed on the right upper side of the expanded electrode 183 toward the connection electrode 182, for example. In this regard, the distance dt1 of the first shield portion 184_1 protruding from the second shield portion 184_2 may be equal to or greater than about 50% of the width W2 of the expanded electrode 183 measured in the direction parallel to the direction in which the first shield portion 184_1 protrudes from the second shield portion 184_2. In FIG. 1, the direction in which the first shield portion 184_1 protrudes from the second shield portion 184_2 may be parallel with the first direction D1. When the distance dt1 is equal to or greater than about 50% of the width W2 of the expanded electrode 183, it is possible to effectively prevent the pixel electrode 181 and the expanded electrode 183 from interfering with each other. Accordingly, it is possible to suppress the electric field between the pixel electrode 181 and the expanded electrode 183 from becoming unstable, and it is possible to enhance the control over the liquid-crystal molecules 210 by the pixel electrode 181.

In an exemplary embodiment, the distance dt1 of the first shield portion 184_1 protruding from the second shield portion 184_2 may be smaller than the width W2 of the expanded electrode 183 measured in the direction parallel to the direction in which the first shield portion 184_1 protrudes from the second shield portion 184_2. Accordingly, there may be a sufficient space where the connection electrode 182 is disposed. However, in exemplary embodiments of the invention where the pixel electrode 181 is not connected to the expanded electrode 183 via the shortest path but via a bypass path, the aforementioned feature may not be applied.

A first alignment film (not shown) may be additionally disposed on the pixel electrode 181, the connection electrode 182, the expanded electrode 183 and the shield electrode 184. The first alignment layer may control an initial orientation angle of the liquid crystal molecules 210 injected into the liquid-crystal layer 200.

Subsequently, the second display substrate 300 will be described.

The second display substrate includes a second base substrate 310, a light-blocking element 320, an overcoat layer 330, and a common electrode 340.

The second base substrate 310 may be disposed such that it faces the first base substrate 110. The second base substrate 310 may have durability to withstand external impact. The second base substrate 310 may be a transparent insulation substrate. In an exemplary embodiment, the second base substrate 310 may be a glass substrate, a quartz substrate, a transparent resin substrate, etc., for example. The second base substrate 310 may be either a flat plate or a curved plate in a predetermined direction.

The light-blocking element 320 may be disposed on a surface of the second base substrate 310 facing the first display substrate 100. The light-blocking element 320 may overlap the gate line 122, the data line 162, the TFT 167 and the contact hole 174, i.e., the light-blocking element 320 overlaps an area other than the active area 11, thereby blocking light transmission in the area other than the active area 11. However, this is merely illustrative. In exemplary embodiments of the invention, the light-blocking element 320 may be disposed in an area other than the active area 11 except for some areas of the data line 162 adjacent to the pixel electrode 181. In this case, some area of the data line 162 not overlapped by the light-blocking element 320 may be overlapped by the shield electrode 184, such that the transmission of light may be blocked.

The overcoat layer 330 is disposed on a surface of the light-blocking element 320 facing the first display substrate 100. The overcoat layer 330 may reduce a level difference caused by the light-blocking element 320. In another exemplary embodiment, the overcoat layer 330 may be eliminated.

The common electrode 340 is disposed on a surface of the overcoat layer 330 facing the first display substrate 100.

In an exemplary embodiment, the common electrode 340 may include a transparent conductive material such as ITO, IZO, ITZO, and AZO.

The common electrode 340 may be provided throughout the entire surface of the second base substrate 310 as a sheet of plate. The common electrode 340 may receive a common signal from an external source and may form an electric field across the liquid-crystal layer 200 together with the pixel electrode 181.

The common signal may be provided from an external source and the voltage level of the common signal may be kept constant while the LCD device is driven. Accordingly, an electric field may be generated between the pixel electrode 181 and the common electrode 340 overlapping each other due to a difference between the data signal provided to the pixel electrode 181 and the common electrode 340 and the voltage value of the common signal. The liquid-crystal molecules 210 may be rotated or tilted by the electric field.

In exemplary embodiments of the invention, a voltage having substantially the same level with the common signal may be provided to the shield electrode 184. Accordingly, while the LCD device is driven, an electric field may not be generated between the shield electrode 184 and the common electrode 340 overlapping each other. This is because the signal having the same voltage value is provided to the shield electrode 184 and the common electrode 340 so that no potential difference is made. Accordingly, the liquid-crystal molecules 210 disposed between the shield electrode 184 and the common electrode 340 overlapping each other may not be rotated or tilted, such that the liquid-crystal molecules 210 remain as when the LCD device is powered off. In an exemplary embodiment, the transmission of light may be blocked, for example.

In an exemplary embodiment, a second alignment film (not shown) may be disposed on a surface of the common electrode 340 facing the first display substrate 100. Similarly to the first alignment film, the second alignment layer may control an initial orientation angle of the liquid-crystal molecules 210 injected into the liquid-crystal layer 200.

Hereinafter, the liquid-crystal layer 200 will be described.

The liquid-crystal layer 200 may include liquid-crystal molecules 210 having dielectric anisotropy and refractive anisotropy. The liquid-crystal molecules 210 may be aligned vertically with respect to the first display substrate and the second display substrate 300 when an electric field is not applied. When an electric field is generated between the first display substrate 100 and the second display substrate 300, the liquid-crystal molecules 210 are rotated or tilted in a predetermined direction between the first display substrate 100 and the second display substrate 300 to thereby change the polarization of light.

Hereinafter, the effects achieved by disposing the first shield portion 184_1 will be described.

Figure 3:
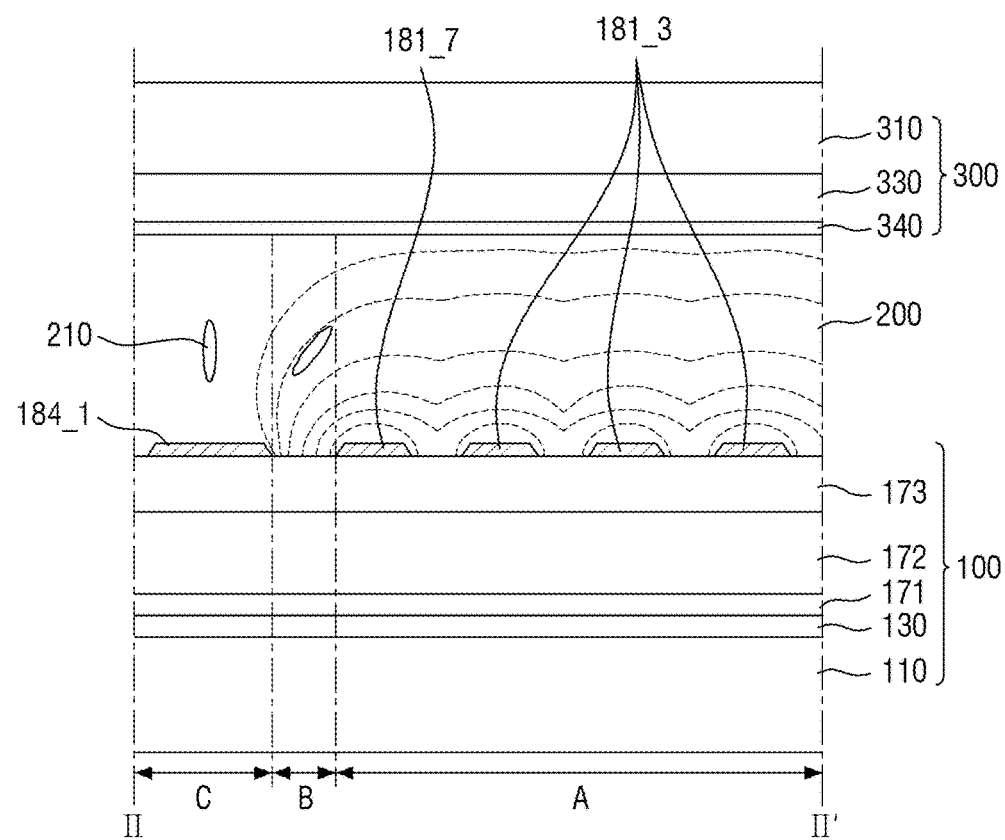
FIG. 3 is a cross-sectional view taken along line II-II' of FIG. 1.

FIG. 3 is a cross-sectional view taken along line II-II' of FIG. 1.

In the liquid-crystal molecules 20 shown in FIG. 3, equipotential lines are depicted with dotted lines. The direction of the electric field defined in the liquid-crystal molecules 200 may be perpendicular to the tangent line of the equipotential lines.

Referring to FIG. 3, in area A where the pixel electrode 181 (refer to FIG. 1) is disposed, the equipotential lines are provided generally in parallel with the pixel electrode 181. The electric field may be generated along a direction perpendicular to the tangent line of the equipotential lines. The intensity of the electric field becomes stronger as the equipotential lines each representing different potentials are closer to one another. Accordingly, ignoring the force that is exerted to a liquid-crystal molecule 210 when an adjacent liquid-crystal molecule 210 is tilted so that it physically affects the liquid-crystal molecule 210, the direction in which the liquid-crystal molecules 210 disposed above the pixel electrode 181 are tilted may not have a predetermined directivity.

In area B between the first shield portion 184_1 and the pixel electrode 181, an electric field may be generated such that it may be directed to the left or the right of FIG. 3. Accordingly, the liquid-crystal molecules 210 disposed in area B may be tilted to the right. As the liquid-crystal molecules 210 disposed in area B are tilted to the right, the liquid-crystal molecules 210 disposed in area A in turn may be affected such that they may be tilted to the right as well. Accordingly, by disposing the first shield portion 184_1, it is possible to suppress the electric field in areas A, B and C from becoming unstable, and it is possible to enhance the control over the liquid-crystal molecules 210 in areas B and C by the pixel electrode 181. In an exemplary embodiment, as the control over the liquid-crystal molecules 210 by the pixel electrode 181 is enhanced, resilience of the liquid-crystal molecules 210 to correct misaligned liquid-crystal molecules 210 may be improved. In an exemplary embodiment, the response speed of the LCD device may also be improved.

Incidentally, because the level of the voltage applied to the first shield portion 184_1 is substantially equal to the level of the voltage of the common signal applied to the common electrode 340, an electric field may not be generated in area C where the first shield portion 184_1 overlaps. Accordingly, in area C, the transmission of light may be blocked by the liquid-crystal molecules 210, and thus light leakage may be prevented.

Figure 4:
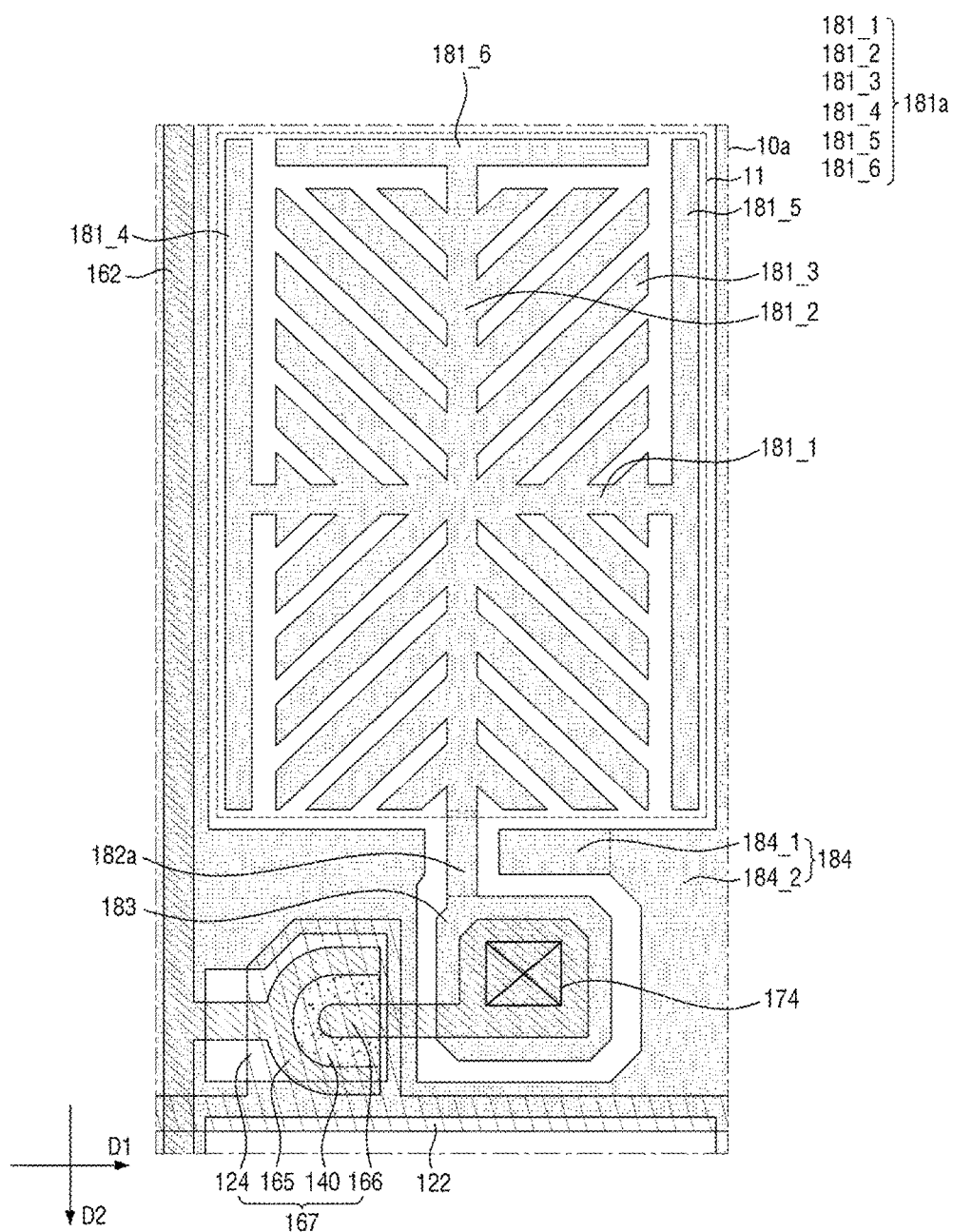
FIG. 4 is a plan view of an exemplary embodiment of a single pixel of an LCD device according to the invention.

FIG. 4 is a plan view of a single pixel of an LCD device according to an exemplary embodiment of the invention.

Referring to FIG. 4, a pixel 10a of an LCD device according to the exemplary embodiment may include a data line 162, a gate line 122, a TFT 167, a contact hole 174, a pixel electrode 181a, a connection electrode 182a, an expanded electrode 183 and a shield electrode 184.

The pixel 10a is different from the pixel 10 described above with reference to FIGS. 1 and 2 in that the structure of the pixel electrode 181a is different from the pixel electrode 181 of FIG. 1, specifically, the pixel electrode 181a does not include the fourth side electrode 181_7. Therefore, descriptions will be made focusing on differences, and the redundant description will be omitted.

According to the exemplary embodiment, the pixel electrode 181a includes a first stem electrode 181_1, a second stem electrode 181_2, branch electrodes 181_3 and first to third side electrodes 181_4, 181_5 and 181_6. The connection electrode 182a connects the expanded electrode 183 with the pixel electrode 181a. It is to be noted that the connection electrode 182a may be directly connected to the second stem electrode 181_2, unlike the embodiment shown in FIG. 1. As described above, by disposing the first shield portion 184_1 in the area between the expanded electrode 183 and the pixel electrode 181a, the control over the liquid-crystal molecules 210 (refer to FIGS. 2 and 3) is enhanced. Accordingly, the liquid-crystal molecules 210 is controlled even without the fourth side electrode 181-7 of the pixel electrode 181 shown in FIG. 1.

The other elements are substantially identical to those described above with reference to FIGS. 1 and 2, and therefore, descriptions thereof will not be made.

Figure 5:
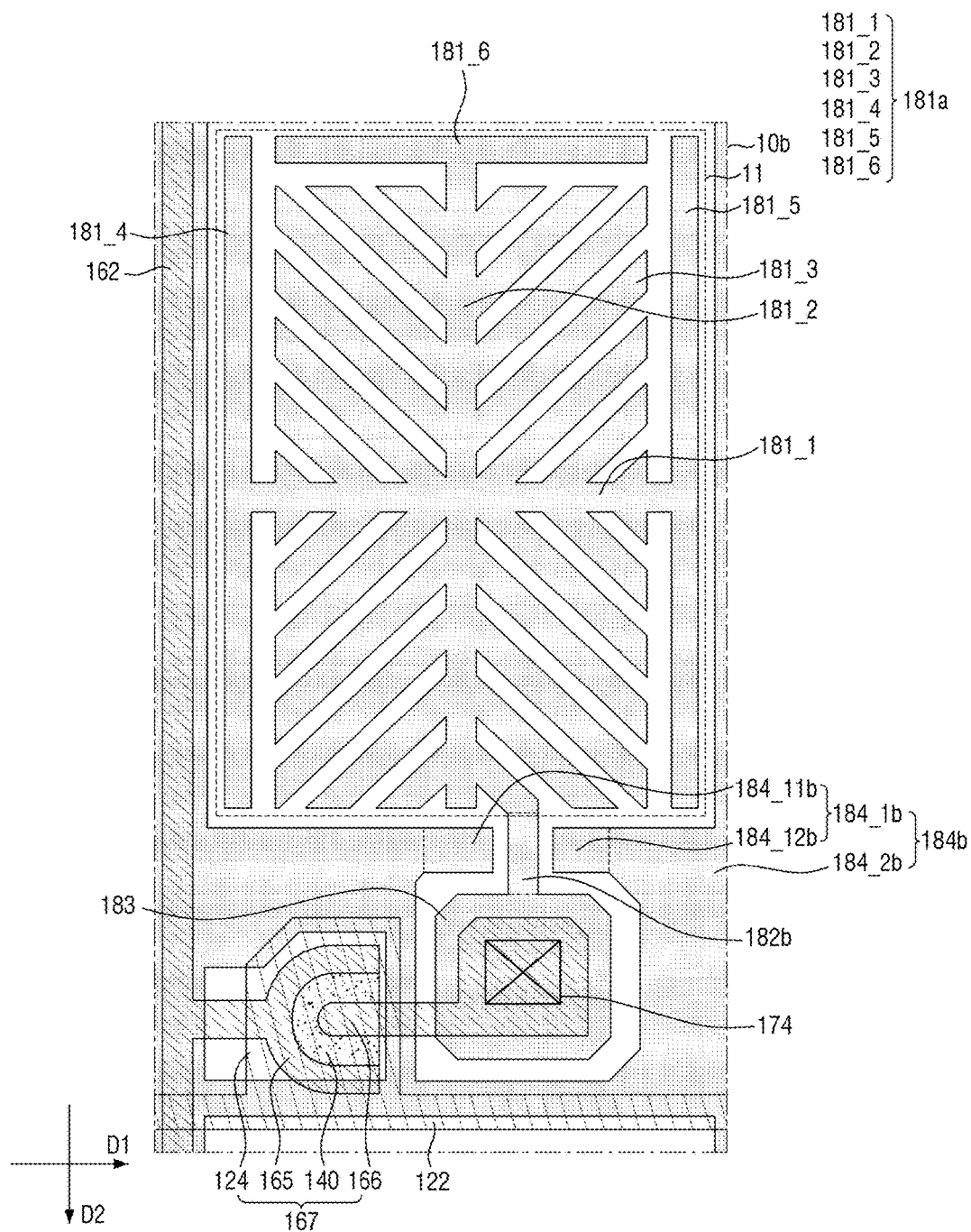
FIG. 5 is a plan view of an exemplary embodiment of a single pixel of an LCD device according to the invention.

FIG. 5 is a plan view of a single pixel of an LCD device according to an exemplary embodiment of the invention.

Referring to FIG. 5, a pixel 10b of an LCD device according to the exemplary embodiment may include a data line 162, a gate line 122, a TFT 167, a contact hole 174, a pixel electrode 181a, a connection electrode 182b, an expanded electrode 183 and a shield electrode 184b.

The pixel 10b is different from the pixel 10a described above with reference to FIG. 4 in that the structures of a first shield portion 184_1b and the connection electrode 182b are different from the first shield portion 184_1 and the connection electrode 182a of FIG. 4, that the connection electrode 182b is connected to a branch electrode 181_3 of the pixel electrode 181a, and that the first shield portion 184_1b is divided into two portions. Therefore, descriptions will be made focusing on differences, and the redundant description will be omitted.

According to the exemplary embodiment, the connection electrode 182b is connected to an end of a branch electrode 181_3. That is, the connection electrode 182b need not be disposed on the center line that equally divides the pixel electrode 181a vertically. Accordingly, in FIG. 5, there may be areas provided between the expanded electrode 183 and the pixel electrode 181a on the left and right sides of the connection electrode 182b, respectively.

The first shield portion 184_1b includes a first sub-shield portion 184_11b and a second sub-shield portion 184_12b, each of which may protrude from a second shield portion 184_2b. Specifically, in FIG. 5, the first sub-shield portion 184_11b protrudes from the second shield portion 184_2b disposed on the left side of the connection electrode 182b, and the second sub-shield portion 184_12b protrudes from the second shield portion 184_2b disposed on the right side of the connection electrode 182b. Accordingly, even when the location of the connection electrode 182b is changed, it is possible to prevent the pixel electrode 181a and the expanded electrode 183 from interfering with each other by changing the location and structure of the first shield portion 184_1b. As a result, a control over the liquid-crystal molecules 210 by the pixel electrode 181a is enhanced.

The other elements are substantially identical to those described above with reference to FIGS. 1, 2 and 4, and therefore, descriptions thereof will not be made.

Figure 6:
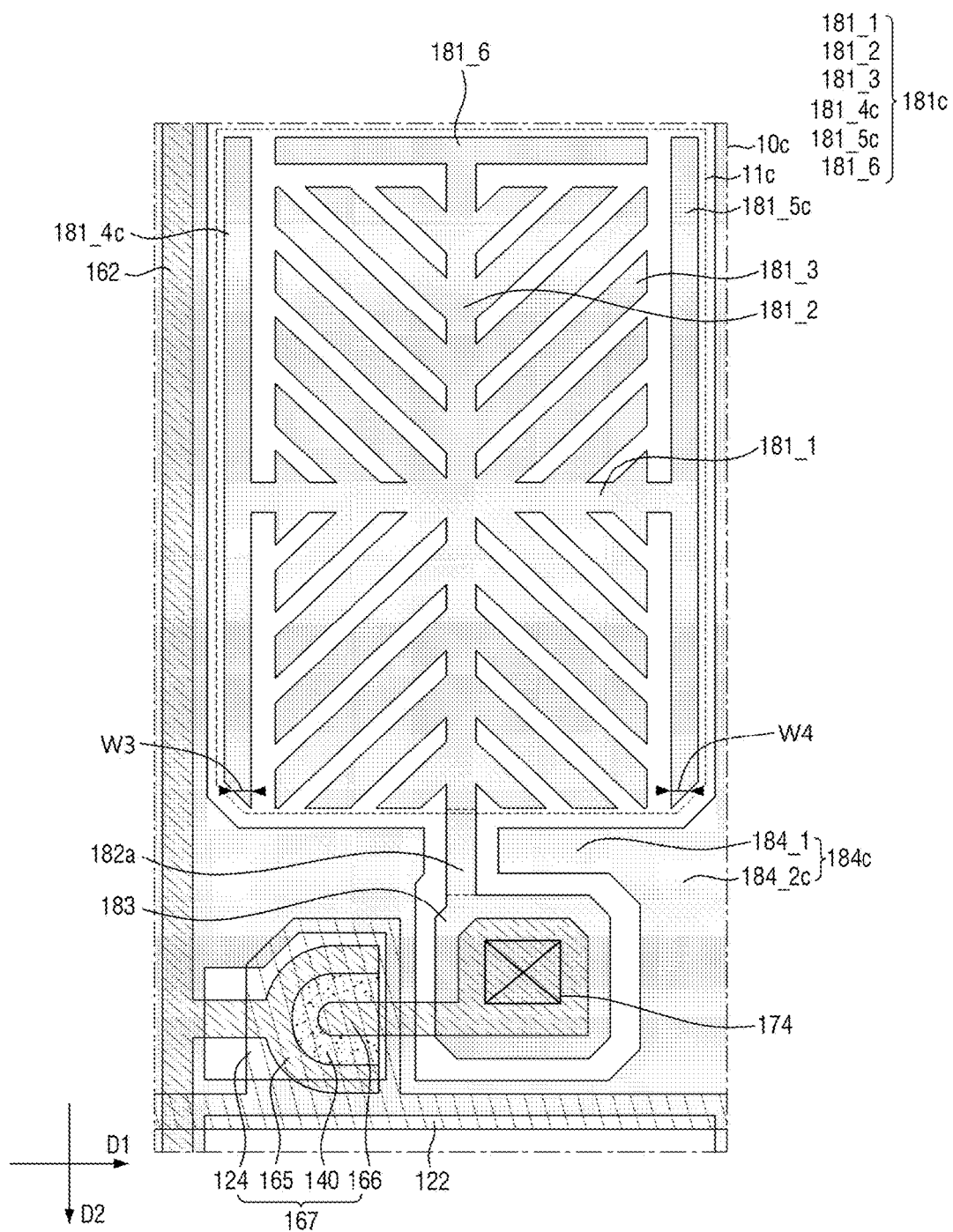
FIG. 6 is a plan view of an exemplary embodiment of a single pixel of an LCD device according to the invention.

FIG. 6 is a plan view of a single pixel of an LCD device according to an exemplary embodiment of the invention.

Referring to FIG. 6, a pixel 10c of an LCD device according to the exemplary embodiment may include a data line 162, a gate line 122, a TFT 167, a contact hole 174, a pixel electrode 181c, a connection electrode 182a, an expanded electrode 183 and a shield electrode 184c.

The pixel 10c is different from the pixel 10a described above with reference to FIG. 4 in that the shape of the active area 11c is different from the active area 11 of FIG. 4, that the structures of a first side electrode 181_4c and a second side electrode 181_5c are different, and that the structure of a second shield portion 184_2c is different. Therefore, descriptions will be made focusing on differences, and the redundant description will be omitted.

In the exemplary embodiment, each of the first side electrode 181_4c and the second side electrode 181_5c may include a portion with different widths in the first direction D1. Specifically, in FIG. 6, the widths W3 and W4 of the lower end of each of the first side electrode 181_4c and the second side electrode 181_5c become smaller sharply in the first direction D1, such that a chamfered portion is provided. That is, the left side of the first side electrode 181_4c is closer to the right side thereof, and the right side of the second side electrode 181_5c is closer to the left side thereof along a lower direction in FIG. 6. Accordingly, the active area 11c may have a polygonal shape, i.e., a rectangular shape with two lower corners obliquely cut. That is, the widths W3 and W4 of the ends of the first side electrode 181_4c and the second side electrode 181_5c, respectively, perpendicular to the direction in which the first side electrode 181_4c and the second side electrode 181_5c are extended may become smaller sharply.

In an exemplary embodiment, the obliquely cut portions of the active area 11c may be overlapped by the second shield portion 184_2c. Accordingly, the second shield portion 184_2c may conform to the ends of the first side electrodes 181_4c and the second side electrode 181_5c. That is, the outer sides of the second shield portion 184_2c adjacent to the first side electrode 181_4c and the second side electrode 181_5c may be parallel with the outer side of the first side electrode 181_4c and the second side electrode 181_5c, respectively.

As the pixel electrode 181c has the above-described lower end of each of the first side electrode 181_4c and the second side electrode 181_5c and the shield electrode 184c has the above-described second shield portion 184_2c, the control over the liquid-crystal molecules 210 and the resilience of the liquid-crystal molecules 210 of the LCD device are further improved. This is because the electric field generated near the ends of the first side electrode 181_4c and the second side electrode 181_5c is directed toward the center of the pixel electrode 181c where the first stem electrode 181_1 and the second stem electrode 181_2 intersect each other, not in the first direction D1 or the second direction D2.

The other elements are substantially identical to those described above with reference to FIGS. 1, 2 and 4, and therefore, descriptions thereof will not be made.

Figure 7:
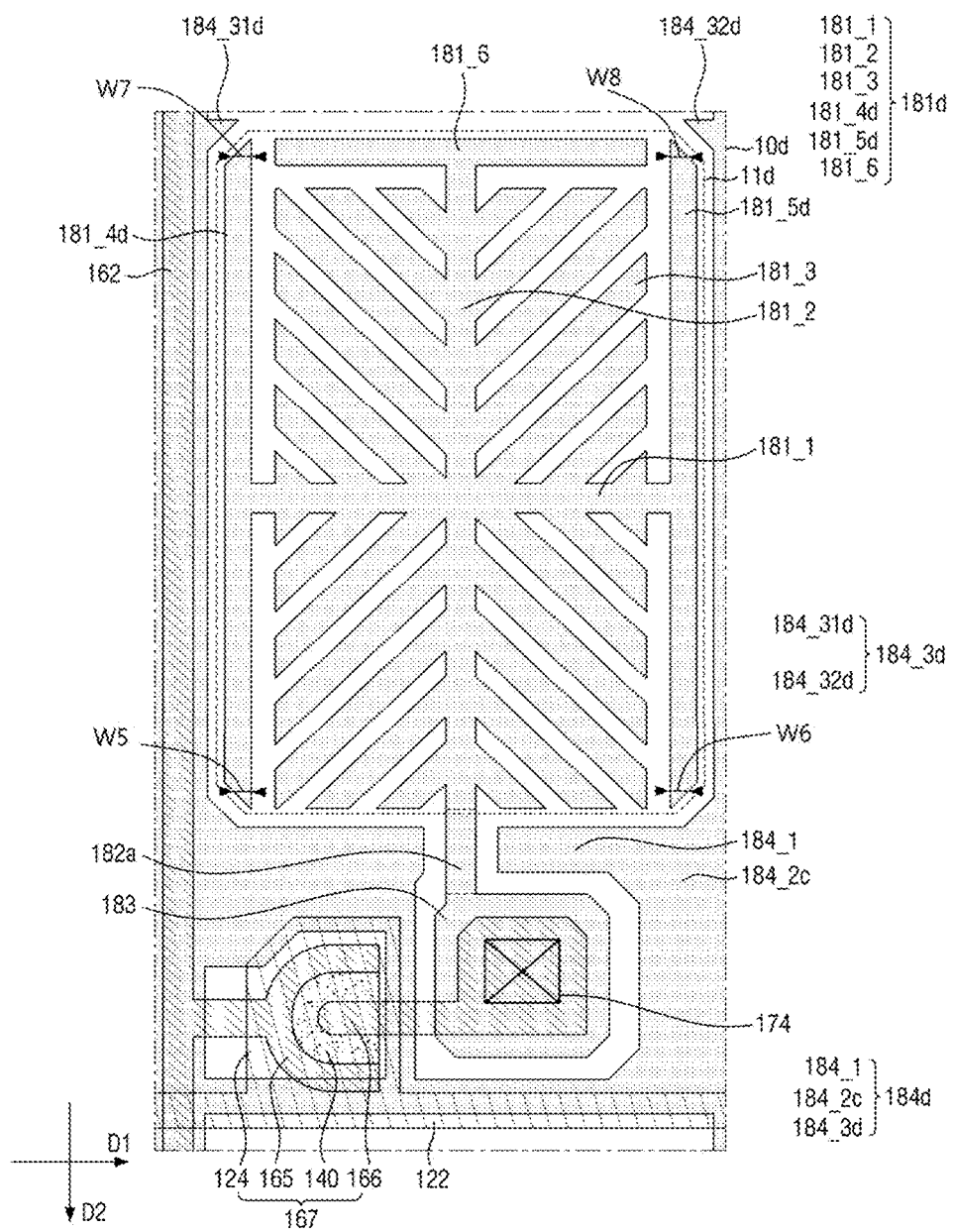
FIG. 7 is a plan view of an exemplary embodiment of a single pixel of an LCD device according to the invention.

FIG. 7 is a plan view of a single pixel of an LCD device according to an exemplary embodiment of the invention.

Referring to FIG. 7, a pixel 10d of an LCD device according to the exemplary embodiment may include a data line 162, a gate line 122, a TFT 167, a contact hole 174, a pixel electrode 181d, a connection electrode 182a, an expanded electrode 183 and a shield electrode 184d.

The pixel 10d is different from the pixel 10c described above with reference to FIG. 6 in that the shape of the active area 11d is different from the active area 11c of FIG. 6, that the structures of a first side electrode 181_4d and a second side electrode 181_5d are different from the first side electrode 181_4c and a second side electrode 181_5c of FIG. 6, and that a third shield portion 184_3d is further included. Therefore, descriptions will be made focusing on differences, and the redundant description will be omitted.

In the exemplary embodiment, the widths W5 to W8 of both ends of each of the first side electrode 181_4d and the second side electrode 181_5d may become smaller. That is, in FIG. 7, the widths W5 to W8 of both of the upper end and the lower end of each of the first side electrode 181_4d and the second side electrode 181_5d may become smaller sharply. Accordingly, the active area 11d may have a polygonal shape, i.e., a rectangular shape with two lower corners and two upper corners obliquely cut.

The lower cut portions of the active area 11d may be overlapped by the second shield portion 184_2c. The description made with reference to FIG. 6 is equally applied hereto. The upper cut portions of the active area 11d may be overlapped by the third shield portion 184_3d.

The third shield portion 184_3d may include a third sub-shield portion 184_31d and a fourth sub-shield portion 184_32d. The third sub-shield portion 184_31d may be disposed in the area provided as the width W6 of the upper end of the first side electrode 181_4d becomes smaller. The fourth sub-shield portion 184_32d may be disposed in the area provided as the width W8 of the upper end of the second side electrode 181_5d becomes smaller. Specifically, in FIG. 7, the third sub-shield portion 184_31d may protrude to the right from the second shield portion 184_2c adjacent to the upper end of the first side electrode 181_4d, and the fourth sub-shield portion 184_32d may protrude to the left from the second shield portion 184_2c adjacent to the upper end of the second side electrode 181_5d. The third sub-shield portion 184_31d and the fourth sub-shield portion 184_32d may conform to the upper end of the first side electrode 181_4d and the upper end of the second side electrode 181_5d, respectively.

Figure 8:
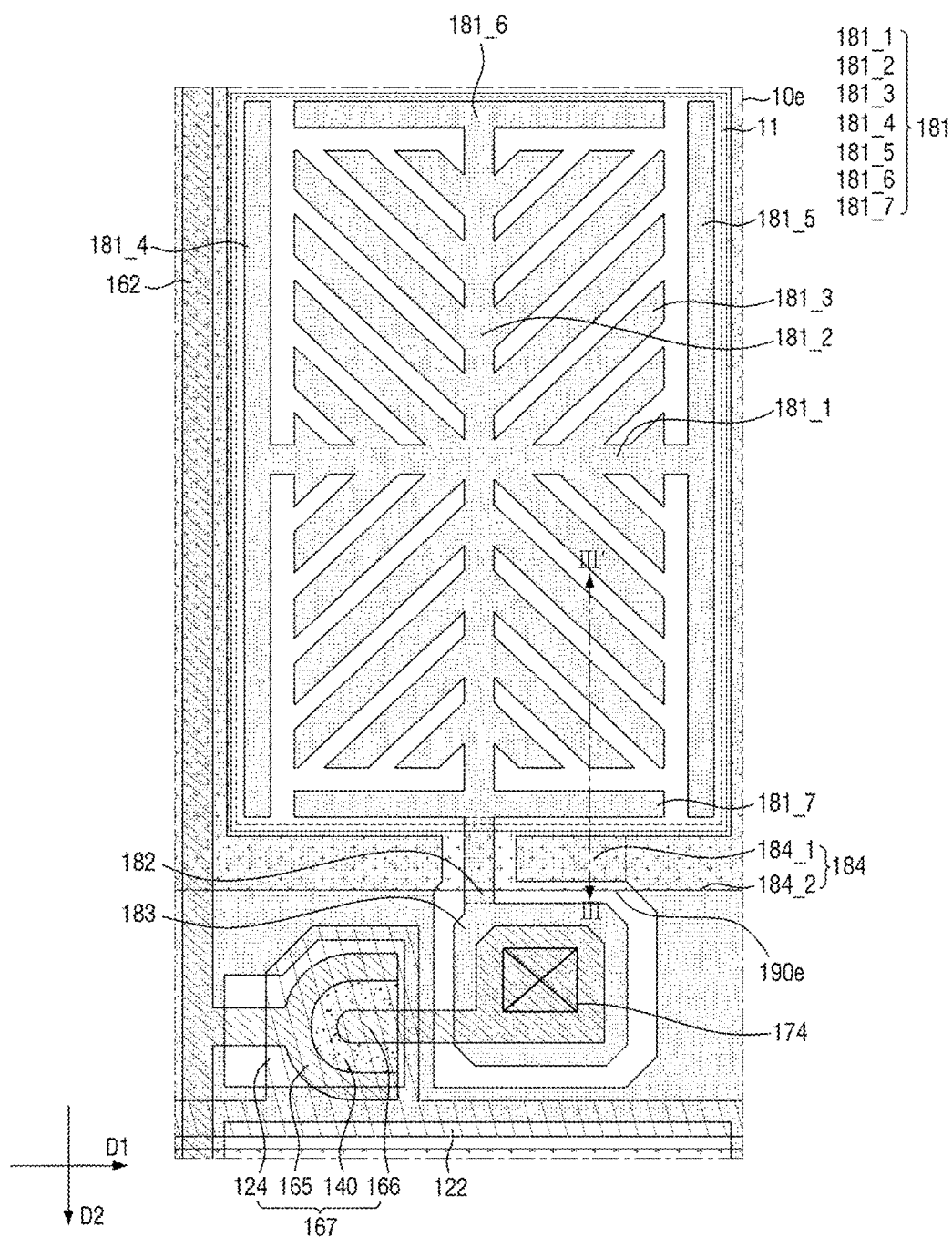
FIG. 8 is a plan view of an exemplary embodiment of a single pixel of an LCD device according to the invention.
Figure 9:
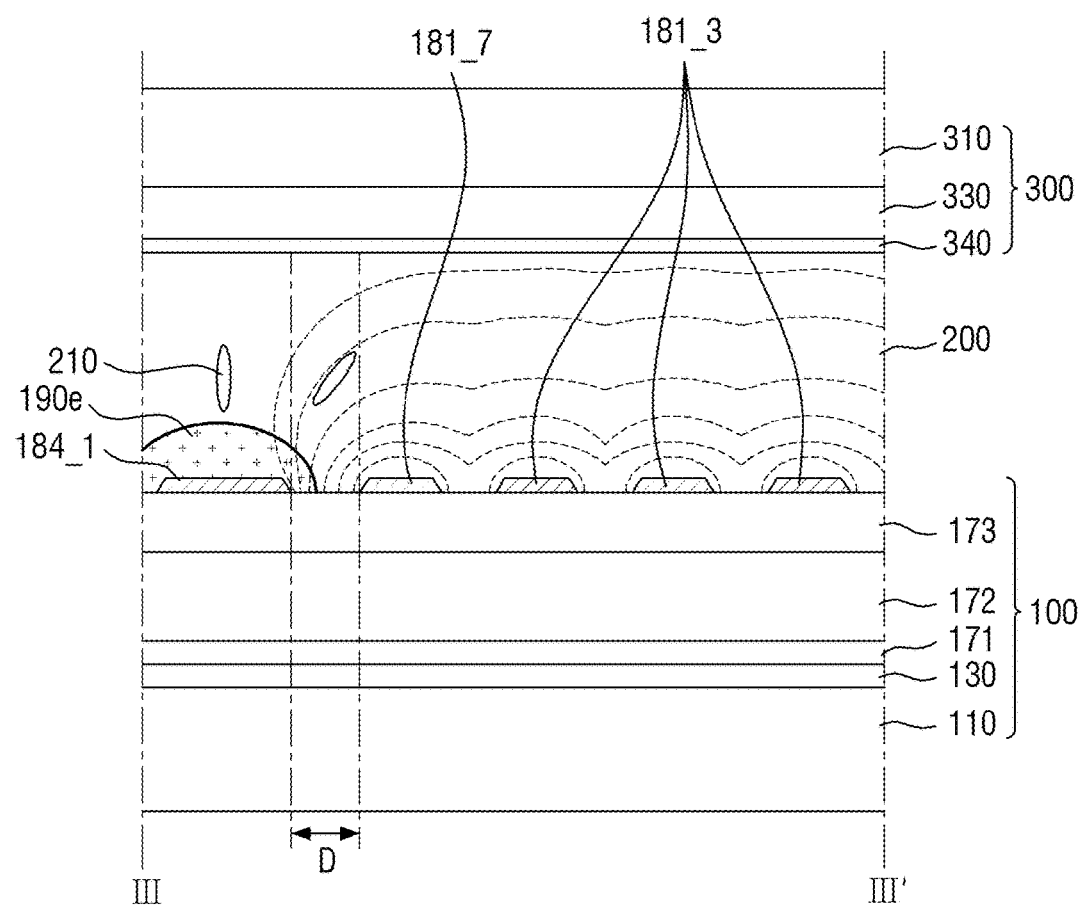
FIG. 9 is a cross-sectional view taken along line III-III' of FIG. 8.

FIG. 8 is a plan view of a single pixel 10e of an LCD device according to an exemplary embodiment of the invention. FIG. 9 is a cross-sectional view taken along line III-III' of FIG. 8.

Referring to FIGS. 8 and 9, the LCD device according to the exemplary embodiment of the invention may include a first display substrate 100, an embossed pattern 190e, a second display substrate 300 and a liquid-crystal layer 200 interposed therebetween.

The LCD device according to the exemplary embodiment of FIGS. 8 and 9 is different from the LCD device described above with reference to FIGS. 1 and 3 in that the LCD device of FIGS. 8 and 9 further includes the embossed pattern 190e. Therefore, descriptions will be made focusing on differences, and the redundant description will be omitted.

The embossed pattern 190e may surround the outer periphery of the active area 11 and may be disposed on the connection electrode 182 and the shield electrode 184. That is, the embossed pattern 190e may be spaced apart from the outer side of each of the first side electrode 181_4, the second side electrode 181_5, the third side electrode 181_6 and the fourth side electrode 181_7 such that the embossed pattern 190e surrounds the pixel electrode 181.

The upper surface of the embossed pattern 190e may be a gently curved shape, and may cause the liquid-crystal molecules 210 thereabove to be tilted to a direction perpendicular to the plane in contact with the upper surface of the embossed pattern 190e. Accordingly, in FIG. 9, the liquid-crystal molecules 210 may be tilted to the right in area D between the fourth side electrode 181_7 and the first shield portion 184_1. As a result, the control over the liquid-crystal molecules 210 by the pixel electrode 181 is enhanced, and the resilience of the liquid-crystal molecules 210 is improved.

The effects of the invention are not limited by the foregoing, and other various effects are anticipated herein.

In concluding the detailed description, those skilled in the art will appreciate that many variations and modifications can be made to the exemplary embodiments without substantially departing from the principles of the invention.

Therefore, the disclosed exemplary embodiments of the invention are used in a generic and descriptive sense only and not for purposes of limitation.

What is claimed is:
1. A liquid-crystal display device comprising:
a substrate;
a thin-film transistor disposed on the substrate;
an insulation film disposed on the thin-film transistor;
a pixel electrode disposed on the insulation film;
an expanded electrode disposed in a same layer as the pixel electrode;
a connection electrode which is disposed in the same layer as the pixel electrode and connects the pixel electrode with the expanded electrode; and
a shield electrode which is disposed in the same layer as the pixel electrode and separated from the pixel electrode, the connection electrode and the expanded electrode,
wherein the expanded electrode is electrically connected to the thin-film transistor via a contact hole defined in the insulation film,
wherein the shield electrode comprises a first shield portion disposed between the pixel electrode and the contact hole in a plan view, and a second shield portion adjacent to the first shield portion, and
wherein the shield electrode continuously surrounds the expanded electrode on at least three sides defining the expanded electrode in a plan view without any other intervening elements between the expanded electrode and the shield electrode other than the connection electrode in the same layer.

2. The liquid-crystal display device of claim 1, further comprising:
a data line disposed on the substrate, wherein the thin-film transistor is electrically connected to the data line.

3. The liquid-crystal display of claim 2, wherein the second shield portion overlaps the data line.

4. The liquid-crystal display device of claim 1, wherein the first shield portion protrudes from the second shield portion toward the connection electrode.

5. The liquid-crystal display device of claim 4, wherein a length of the first shield portion protruding from the second shield portion is smaller than a width of the expanded electrode in a direction parallel with a direction in which the first shield portion protrudes from the second shield portion.

6. The liquid-crystal display device of claim 4, wherein a length of the first shield portion protruding from the second shield portion is equal to or greater than 50% of a width of the expanded electrode in a direction parallel with a direction in which the first shield portion protrudes from the second shield portion.

7. The liquid-crystal display device of claim 4, wherein the first shield portion further comprises a first sub-shield portion and a second sub-shield portion,
wherein the first sub-shield portion is spaced apart from a side of the connection electrode, and
wherein the second sub-shield portion is spaced apart from an opposite side of the connection electrode.

8. The liquid-crystal display device of claim 1, wherein the pixel electrode comprises
a first stem electrode extended in a first direction,
a second stem electrode extended in a second direction perpendicular to the first direction and intersecting the first stem electrode, and a plurality of branch electrodes each extended from at least one of the first stem electrode and the second stem electrode in a direction oblique to the first direction and the second direction.

9. The liquid-crystal display device of claim 8, wherein the pixel electrode further comprises
a first side electrode extended in the second direction, connected to an end of the first stem electrode in the first direction, and spaced apart from ends of the plurality of branch electrodes,
a second side electrode extended in the second direction, connected to an opposite end of the first stem electrode in the first direction, and spaced apart from ends of the plurality of branch electrodes, and
a third side electrode extended in the first direction, connected to an end of the second stem electrode in the second direction, and spaced apart from ends of the plurality of branch electrodes.

10. The liquid-crystal display device of claim 9, wherein the pixel electrode further comprises
a fourth side electrode extended in the first direction, connected to an opposite end of the second stem electrode in the second direction, and spaced apart from ends of the plurality of branch electrodes,
wherein the connection electrode is connected to the fourth side electrode.

11. The liquid-crystal display device of claim 9, wherein the connection electrode is connected to the third side electrode.

12. The liquid-crystal display device of claim 9, wherein a width of the first side electrode perpendicular to a direction in which the first side electrode is extended becomes smaller toward the end of the first side electrode, and
wherein a width of the second side electrode perpendicular to a direction in which the second side electrode is extended becomes smaller toward the end of the second side electrode.

13. The liquid-crystal display device of claim 12, wherein an outer side of the second shield portion adjacent to the first side electrode is in parallel with an outer side of the first side electrode, and
wherein an outer side of the second shield portion adjacent to the second side electrode is in parallel with an outer side of the second side electrode.

14. The liquid-crystal display device of claim 9, wherein a width of the first side electrode perpendicular to a direction in which the first side electrode is extended becomes smaller toward the end and the opposite end of the first side electrode, and
wherein a width of the second side electrode perpendicular to a direction in which the second side electrode is extended becomes smaller toward the end and an opposite end of the second side electrode.

15. The liquid-crystal display device of claim 14, wherein the shield electrode further comprises a third shield portion, the third shield portion comprising a third sub-shield portion and a fourth sub-shield portion, wherein:
an outer side of the second shield portion adjacent to the end of the first side electrode is in parallel with an outer side of the first side electrode,
an outer side of the second shield portion adjacent to the end of the second side electrode is in parallel with an outer side of the second side electrode,
the third sub-shield portion is adjacent to the opposite end of the first side electrode, protrudes from the side shield portion and includes an outer side in parallel with an outer side of the opposite end of the first side electrode, and
the fourth sub-shield portion is adjacent to an opposite end of the second side electrode, protrudes from the side shield portion and includes an outer side in parallel with an outer side of the opposite end of the second side electrode.

16. The liquid-crystal display device of claim 1, further comprising:
an embossed pattern which is disposed on the shield electrode and surrounds the pixel electrode in the plan view.

17. A liquid-crystal display device comprising:
a substrate;
a thin-film transistor disposed on the substrate;
a pixel electrode disposed on the thin-film transistor;
an expanded electrode disposed in a same layer as the pixel electrode and connected to the thin-film transistor;
a connection electrode which is disposed in the same layer as the pixel electrode and which connects the pixel electrode with the expanded electrode; and
a shield electrode disposed in the same layer as the pixel electrode, separated from the pixel electrode, the connection electrode and the expanded electrode, and comprising:
a first shield portion disposed between the pixel electrode and the expanded electrode, and
a second shield portion adjacent to the first shield portion,
wherein the shield electrode continuously surrounds the expanded electrode on at least three sides defining the expanded electrode in a plan view without any other intervening elements between the expanded electrode and the shield electrode other than the connection electrode in the same layer.

18. The liquid-crystal display device of claim 17, further comprising:
a liquid-crystal layer disposed on the pixel electrode; and
a common electrode disposed on the liquid-crystal layer,
wherein the shield electrode and the common electrode are at substantially a same voltage level.

19. The liquid-crystal display device of claim 18, wherein the pixel electrode and the common electrode are at different voltage levels.

20. A liquid-crystal display device comprising:
a substrate;
a gate line and a thin-film transistor disposed on the substrate;
an insulation film disposed on the thin-film transistor and the gate line;
a pixel electrode disposed on the insulation film;
an expanded electrode disposed in a same layer as the pixel electrode;
a connection electrode which is disposed in the same layer as the pixel electrode and connects the pixel electrode with the expanded electrode; and
a shield electrode which is disposed in the same layer as the pixel electrode and separated from the pixel electrode, the connection electrode and the expanded electrode,
wherein the expanded electrode is electrically connected to the thin-film transistor via a contact hole defined in the insulation film, and
wherein the shield electrode comprises a first shield portion disposed between the pixel electrode and the contact hole in a plan view, and a second shield portion adjacent to the first shield portion, wherein the first shield portion does not overlap the gate line.

* * * * *